United States Patent [19]

Alther

[11] 4,402,881
[45] Sep. 6, 1983

[54] METHOD OF MAKING ORGANOPHILIC CLAYS

[75] Inventor: George R. Alther, Ferndale, Mich.

[73] Assignee: International Minerals & Chem. Corp., Terre Haute, Ind.

[21] Appl. No.: 206,196

[22] Filed: Nov. 12, 1980

[51] Int. Cl.$^3$ ............................ B01J 13/00; C07F 7/02
[52] U.S. Cl. ............................ 260/448 C; 252/8.5 M; 252/315.1; 260/440; 260/446
[58] Field of Search ............... 252/8.5 M, 8.5 P, 316, 252/28; 260/448 C

[56] References Cited

U.S. PATENT DOCUMENTS

| | | | |
|---|---|---|---|
| 2,531,427 | 11/1950 | Hauser | 260/448 |
| 2,531,440 | 11/1950 | Jordan | 252/28 |
| 2,859,234 | 11/1958 | Clem | 260/448 |
| 4,105,578 | 8/1978 | Finlayson | 252/316 |
| 4,193,806 | 3/1980 | Finlayson | 106/20 |

*Primary Examiner*—Herbert B. Guynn
*Attorney, Agent, or Firm*—Robert H. Dewey; H. J. Barnett

[57] ABSTRACT

A substantially dry method for making organophilic clays. Smectite clays, having a moisture content of less than 12% by weight are sprayed with an activator substance comprising about 1–10% by weight of the clay of a hydrophobic radical including those obtained from an "onium" base selected from a class consisting of ammonium, oxonium, sulfonium, arsonium, stibonium and tellaronium. Organic amines and ammonium salts are preferred sources for the hydrophobic radical, and a substituted, hydrogenated tallow ammonium chloride is particularly preferred. The pretreated clay is then subjected to mechanical working such as by compaction to activate the clay.

The subject method avoids the addition of water or other solvent to the clay when adding the activator substance, and therefore avoids the added cost of later removing the water, or other solvent. The physical properties of the dry processed organophilic clay are superior in some respects to organophilic clays made by the prior art methods.

The organophilic clay made by the subject method can be used for gelling oils and oil-muds to suspend solids in a fluid when the fluid is static. It can also be used to impart cuttings-carrying ability to oil well drilling muds.

1 Claim, No Drawings

METHOD OF MAKING ORGANOPHILIC CLAYS

BACKGROUND OF THE INVENTION

Organophilic clays are used in oil-based drilling muds. To make such clays by one conventional method, the clay is first slurried at a low concentration in water. Dissolved amine activator is combined with the dilute clay slurry in a reaction tank. The reacted slurry is thereafter passed through a filter press, and the partially dewatered product is then flash-dried and hammer-milled. The above process is energy-intensive, especially in the flash-drying step.

In another known method, the clay is wetted to about 20% moisture with a water solution of the amine reagent. The resulting paste mixture is subjected to mechanical shearing action in a pug mill or extruder to cause ion exchange to take place. Following the milling action, the paste requires drying with the consequent added energy costs.

PRIOR ART

A method of making a cation-modified clay is described in U.S. Pat. No. 2,531,427. A hydrophobic radical replaces the inorganic cations present in the clay to form with the clay anion an onium-clay swelling to at least ten-fold in nitrobenzene. The hydrophobic radical is an "onium" base selected from a class consisting of: ammonium, phosphonium, oxonium, sulfonium, arsonium, stibonium and telluronium.

Cation-modified, organophilic clays are also disclosed in U.S. Pat. No. 2,859,234, and are said to be useful for bodying paints, reinforcing and hardening waxes, thickening wax polishes, adjusting the consistency of printing inks, additives in paint removers, low-solids adhesives, gelled fuels and greases. They can be used in non-polar liquids, such as aliphatic, alicyclic and aromatic hydrocarbons, mineral oils, paraffins, and aliphatic-aromatic hydrocarbons, and in polar liquids, such as alcohols, esters, ketones, nitroparaffins and nitrated aromatic hydrocarbons, as well as in solvents of intermediate polarity, such as halogenated paraffins, halogenated aromatic hydrocarbons, vegetable oils, animal oils and fats.

The above patent discloses a number of organic amines and ammonium salts which are combined with bentonite-type clays to make an organophilic clay. These compounds include: octylamine, nonylamine, 2-ethylhexylamine, hexylamine, dimethylhexylamine, diethylheptylamine, dibutylamylamine, dimethyloctylamine, methyloctylamine, ethylhexylamine, dioctylamine, diamylcyclohexylamine, dicyclohexylamine, benzyldihexylamine, phenethyloctylamine and the like, as well as water-soluble acid addition salts with acids such as hydrochloric, sulfuric, acetic, citric, tartaric, hydrobromic, phosphoric. Quaternary ammonium salts are also operative, including trimethylhexylammonium chloride, triethyloctylammonium bromide, dimethyldicyclohexylammonium chloride and benzylidimethylhexylammonium chloride. Such salts are obtained by reacting tertiary amines of the type disclosed above with aliphatic or araliphatic esters of hydrohalic, sulfuric or organic sulfonic acids. Among such esters are methyl chloride, ethyl bromide, propyl iodide, dimethyl sulfate, methyl benzenesulfonate, benzyl chloride, phenethylbromide and the like. It is contemplated that any of the above compounds can be used as activator substances in the method of the subject invention.

U.S. Pat. No. 4,105,578 describes making an organophilic clay by reacting a methyl benzyl dialkyl ammonium compound with an aqueous dispersion of a smectite clay. The ammonium compounds employed comprise those having 20-35% alkyl groups of sixteen carbons and 60-75% alkyl groups of eighteen carbons. The smectite clay used should have a cationic exchange capacity of at least 75 meq for 100 g of clay. The ammonium compound used should have an anionic exchange capacity which ranges from 100-120 meq/100 mg of the compound. The particular clays described contain about 10-50% by weight non-clay impurities. In order to gain maximum gelling (thickening) efficiency, a low molecular weight polar organic material, such as an alcohol or ketone, is added to the composition. See U.S. Pat. No. 4,105,578, column 2, lines 19-23.

Another recent patent, U.S. Pat. No. 4,193,806, describes the use of the above type of organophilic clay as a gellant for printing inks. This latter patent is commonly assigned with U.S. Pat. No. 4,105,578, and the method of making the organophilic clays described is generally the same in both references.

A number of different smectite clays are described in the above mentioned patents, including bentonite, hectorite, and synthetically prepared smectite-type clays such as montmorillonite, beidellite, saponite, and stevensite. A number of different quaternary ammonium compounds can be used, also, and the preferred quaternary amine in U.S. Pat. No. 4,105,578 is methylbenzyl dihydrogenated tallow ammonium chloride. See column 4, lines 17-19.

The method of making those clays is described at column 4, lines 39-61 of U.S. Pat. No. 4,105,578, and includes a step of dispersing the clay in water to form a slurry containing about 3-7% by weight clay. Non-clay impurities are removed by centrifuge action, and the quaternary amine salt is added, preferably as a liquid in isopropanol, or dispersed in water. After the reaction has been completed, the slurry of reacted clay is filtered, washed, dried and ground. The above method is particularly energy-intensive, since the amount of water which must be removed is more than about 80% by weight of the slurry.

SUMMARY

The subject invention provides a much more economical method of making organophilic clays by avoiding the addition of any significant amount of water to the clay. The dry, finely ground clay at equilibrium moisture is sprayed with a solution of the activator substance, and the sprayed clay is then subjected to dry compaction two or three times, and is then reground to provide an organophilic clay useful for oil well drilling muds, gelling oils and similar uses.

The activator substances useful comprise hydrophobic radicals derived from aliphatic and alicyclic amines and acid-addition and quaternary ammonium salts thereof. Also contemplated are "onium" bases selected from a class consisting of ammonium, oxonium, sulfonium, arsonium, stibonium and telluronium. A substituted, hydrogenated tallow amine is the preferred source of the hydrophobic radical at the present time.

Clays which may be treated according to the subject method include smectite clays such as montmorillonites, nontronites, hectorites and saponites having low grit contents, Black Hills Bentonite, calcium bentonites, sodium bentonites, Wyoming bentonite, and synthetically prepared clays including synthetic montmorillonite, beidellite, saponite and stevensite. Wyoming bentonite is presently preferred.

The resulting organophilic clay has properties comparable to such clays made by the wet method described above, but it is less expensive to make, since the drying step of the prior method is completely avoided. The mechanical working accomplished by compacting is sufficient.

DETAILED DESCRIPTION
PROCEDURE

Samples of activated/compacted organophilic clays were prepared and compared to organophilic clays made by the conventional wet method described above. The compacted samples were prepared according to the following procedure.

The raw clay sample is first placed in a blender, and sufficient water is added to bring the clay to 12% by weight moisture. The required amount of quaternary ammonium salt dissolved in water is added and the mixture is blended thoroughly. A twin shell blender equipped with a liquid addition/intensifier bar was used. About 1–10% by weight quaternary ammonium salt is used. This addition remains the same as with the other methods.

After blending, the sample is fed through a B-100-A Two Roll Mill, available from K. R. Komarek, Inc., Elk Grove Village, Ill. Operation of the compacting mill follows the manufacturer's instructions provided with the equipment. For the subject compacting, a cylinder pressure of 2200 psi was used, giving a roll pressure of 18,000 psi. The feed screw was set at 6.2, and the roll speed was set at 1.25 (slowest setting).

The samples made according to the invention were compared to an organophilic clay made by conventional slurry method using the standarrd procedures set forth in American Petroleum Institute's method and apparatus publications 13-A and 13-B. A Fann viscometer was used at 300 rpm and 600 rpm. Fluid loss was also determined for the samples following the above API standards. A direct comparison of a clay made according to the dry method described herein to a clay made by the more expensive wet process of the prior art gave the results set forth in Table A below.

cps at 300 rpm). This higher viscosity can also be seen at the other sample solids levels.

Apparent viscosity of the dry process organophilic clay samples were, consequently, also substantially higher than like samples of organophilic clay made by the conventional process. Plastic viscosity showed more stability throughout all the sample sizes for the new dry process clay. Yield points were substantially higher for the new dry process clay, and fluid loss was about the same for both clays.

It is contemplated that the subject process can be conveniently scaled up to much larger volumes by the use of commercial scale equipment. One such commercial scale compactor can be obtained from Allis Chalmers Corporation, West Allis, Wis. A two roll, smooth faced compactor, Model 3230-A, which is capable of developing a maximum force of about 260,000 psi, is the presently preferred equipment for compacting the treated clay on a commercial scale. Other commercial scale mills can also be used, provided that they are capable of developing sufficient compaction pressure to accomplish the desired reaction of the clay with the amine or quaternary ammonium salt reagent and obtain the desired organophilic properties of the clay. A large granulator mill and vibrator screen is conveniently provided to feed the compactor. Suitable equipment of this type is also available from Allis Chalmers and others.

In the typical process, the clay is received at about 12% moisture. The clay is then ground and screened to minus 200 mesh, and transferred along a conveyor where it is sprayed with the amine or quaternary ammonium salt solution so as to add about 1–10% by weight of the amine or quaternary ammonium salt to the finely divided clay prior to compacting. The clay treated with activator is then fed through the compactor, and is compacted under pressure into a compacted sheet having an apparent density of from about 60–94% of the apparent density of the clay before it is ground. The resulting compacted organophilic clay requires no further drying, and is ground and screened to the desired mesh size, and prepared for shipment to the place it is to be used.

The organophilic clays made according to the method of the subject invention can be used for the same purposes as earlier clays of this type. For example, the subject clay can be used for gelling oils and oil-muds

TABLE A

| | Conventional Process Organophilic Clay | | | | Novel Dry Process Organophilic Clay | | | |
|---|---|---|---|---|---|---|---|---|
| | 22.5 g | 18.5 g | 14.5 g | 10 g | 22.5 g | 18.5 g | 14.5 g | 10 g |
| Fann Viscosity | | | | | | | | |
| 600 rpm | 42  63 | 31  46 | 18  27 | 6.5  13 | 34  103 | 75  75 | 50  62 | 9  31 |
| 300 rpm | 30  43 | 18  28 | 8  14 | 0.5  5 | 22  93 | 60  60 | 43  49 | 2  22 |
| AV (Apparent Viscosity) | 31 | 23 | 13.5 | 65 | 56 | 36 | 31 | 15.5 |
| PV (Plastic Viscosity) | 20 | 18 | 13 | 8 | 10 | 13 | 13 | 9 |
| YP (Yield Point) | 13 | 10 | 1 | — | 83 | 47 | 36 | 13 |
| FL (Fluid Loss) | 9 | 11 | — | — | 9 | 9.5 | — | — |

In Table A, the second readings at each sample size under the 600 and 300 rpm Fann viscosity reading are the results obtained after first aging the organophilic clay samples for twenty-four hours after mixing. It is interesting to note that a 22.5 gram sample (aged) of the dry process clay gave substantially higher viscosity compared to a like sample of organophilic clay (also aged) made by the conventional process (63 cps compared to 103 cps at 600 rpm, and 43 cps compared to 93 to suspend solids in a fluid when the fluid is static, and to impart cuttings-carrying ability to the fluid when it is used in drilling operations.

The method of the subject invention provides a superior quality, organophilic clay by a dry compaction process which eliminates the energy-intensive drying steps of the prior art.

I claim:

1. A substantially dry process for making an organophilic clay from a smectite clay comprising first adding to said smectite clay 1–10% by weight of an activator substance having a hydrophobic radical and being selected from the group consisting of aliphatic and alicyclic amine acid-addition and quaternary ammonium salts, said smectite clay having a maximum moisture content of about 12% by weight, thoroughly mixing said activator substance with said clay, and then compacting said clay activator substance mixture into a compacted mass having an apparent density of from about 60–94% of the apparent density of the clay before it is ground, whereby the organophilic properties of said treated clay are substantially improved.

* * * * *

UNITED STATES PATENT AND TRADEMARK OFFICE
CERTIFICATE OF CORRECTION

PATENT NO. : 4,402,881
DATED : September 6, 1983
INVENTOR(S) : George R. Alther

It is certified that error appears in the above-identified patent and that said Letters Patent are hereby corrected as shown below:

Column 1, line 16, "mositure" should read -- moisture --

Column 1, line 61, "benzylidimethyl-" should read
    -- benzyldimethyl- --

Column 3, line 39, "standarrd" should read -- standard --

Column 3, line 42, "comether" should read -- cometer --

Signed and Sealed this

Twenty-second Day of November 1983

[SEAL]

Attest:

GERALD J. MOSSINGHOFF

Attesting Officer    Commissioner of Patents and Trademarks